(12) United States Patent
Slyne

(10) Patent No.: US 8,220,514 B2
(45) Date of Patent: Jul. 17, 2012

(54) TAPE LAYING APPARATUS AND METHOD

(75) Inventor: William J. Slyne, Markman (CA)

(73) Assignee: North Cutting Systems, LLC, Milford, CT (US)

( * ) Notice: Subject to any disclaimer, the term of this patent is extended or adjusted under 35 U.S.C. 154(b) by 19 days.

(21) Appl. No.: 12/951,624

(22) Filed: Nov. 22, 2010

(65) Prior Publication Data

US 2011/0203737 A1    Aug. 25, 2011

Related U.S. Application Data

(63) Continuation-in-part of application No. 11/570,516, filed on Oct. 14, 2008, now Pat. No. 7,836,931.

(30) Foreign Application Priority Data

Jun. 10, 2005   (WO) .................. PCT/IB2005/004184

(51) Int. Cl.
*B65H 81/00* (2006.01)

(52) U.S. Cl. ........ 156/425; 156/574; 156/577; 156/350; 156/523

(58) Field of Classification Search ................. 156/574, 156/350, 577, 523, 425

See application file for complete search history.

(56) References Cited

U.S. PATENT DOCUMENTS

| | | | | |
|---|---|---|---|---|
| 2,738,300 A | * | 3/1956 | Ferlauto et al. | 514/192 |
| 4,636,276 A | * | 1/1987 | Nozaka | 156/353 |
| 4,696,707 A | * | 9/1987 | Lewis et al. | 156/64 |
| 4,997,513 A | * | 3/1991 | Lengen et al. | 156/523 |
| 5,658,420 A | * | 8/1997 | Rossini | 156/504 |
| 5,989,384 A | * | 11/1999 | Grimshaw et al. | 156/312 |
| 6,808,581 B2 | * | 10/2004 | Kuta et al. | 156/187 |
| 7,048,024 B2 | * | 5/2006 | Clark et al. | 156/425 |
| 7,341,086 B2 | * | 3/2008 | Nelson et al. | 156/523 |

* cited by examiner

*Primary Examiner* — Katarzyna Wyrozebski Lee
*Assistant Examiner* — Vishal I Patel
(74) *Attorney, Agent, or Firm* — Thomas & Karceski, P.C.

(57) ABSTRACT

An automated tape head assembly for a multiple axis tape laying machine includes a tape supply reel and a tape compaction roller, and a chute. Tape passes from the supply reel, through the chute, to the tape compaction roller. The tape path and at least a portion of the chute are maintained substantially at a zero Gaussian curvature. The tape path and chute are curved to define a compliance loop that results from a substantially or partially unrestrained curved path between the supply reel and the compaction roller. This structure allows the compaction roller to shift laterally and vertically with respect to the supply reel while the supply reel is in a fixed position with respect to the tape head assembly generally. This structure also allows the compaction roller to roll, steer, and follow the fiber tape's natural path, all with significant independence from the supply reel.

14 Claims, 14 Drawing Sheets

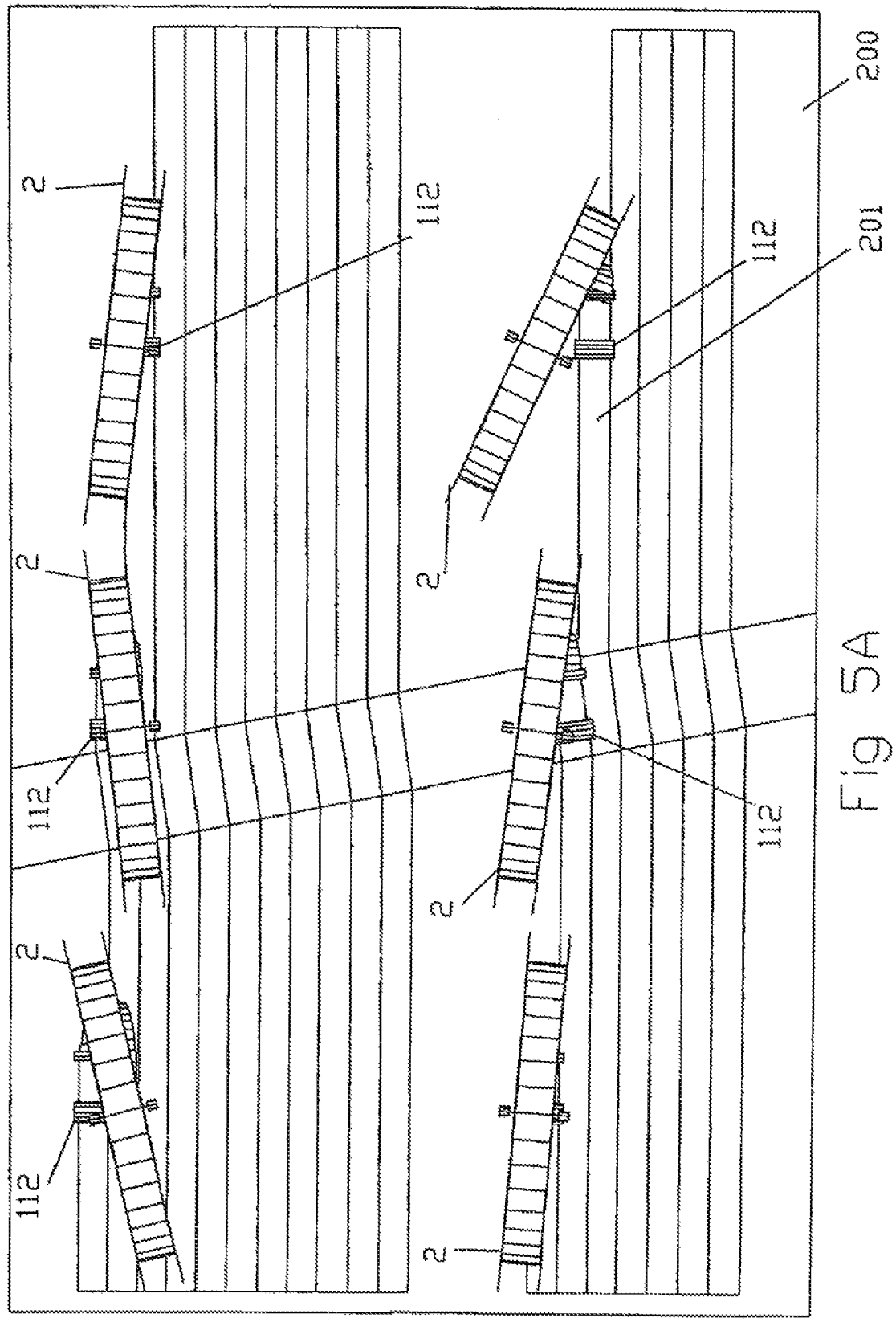

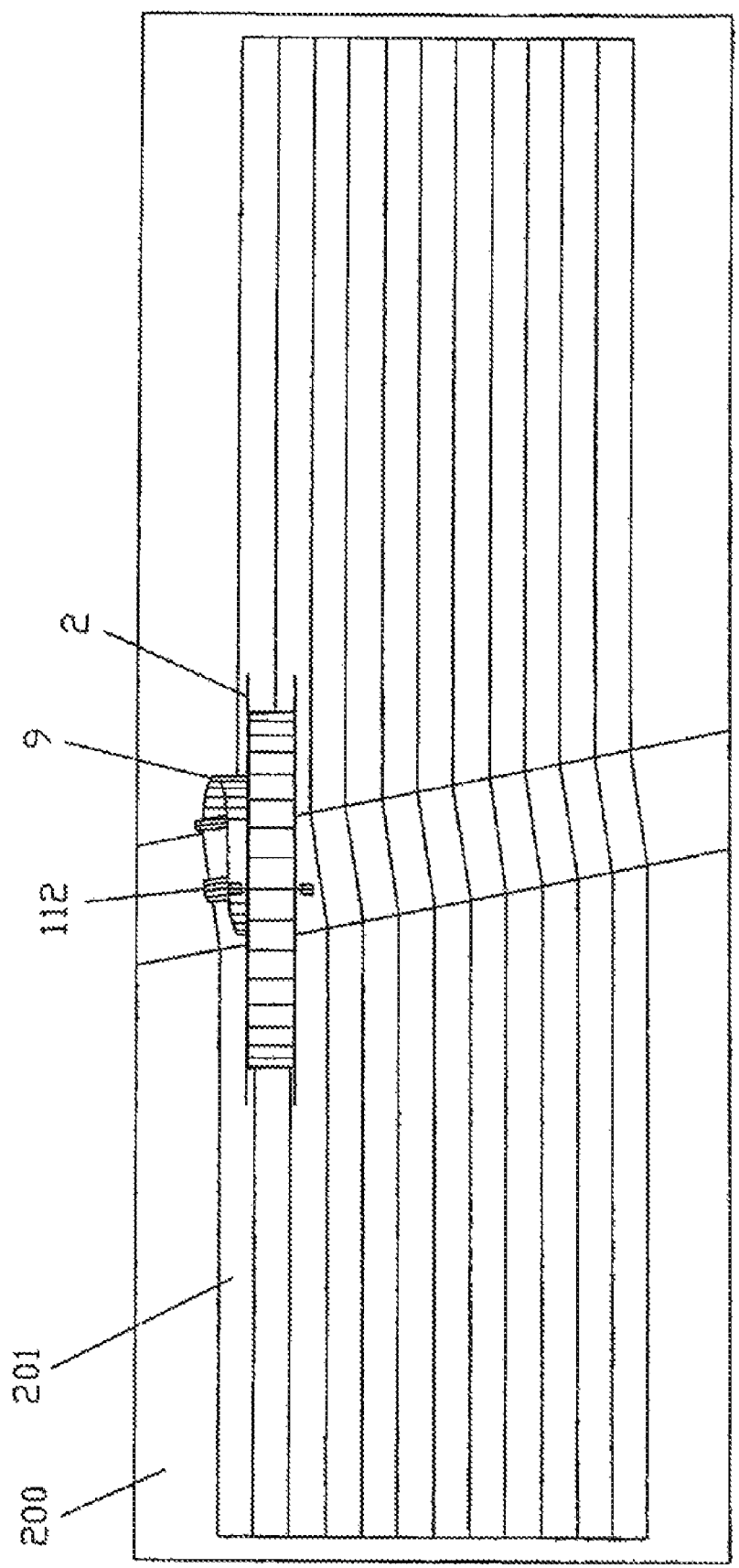

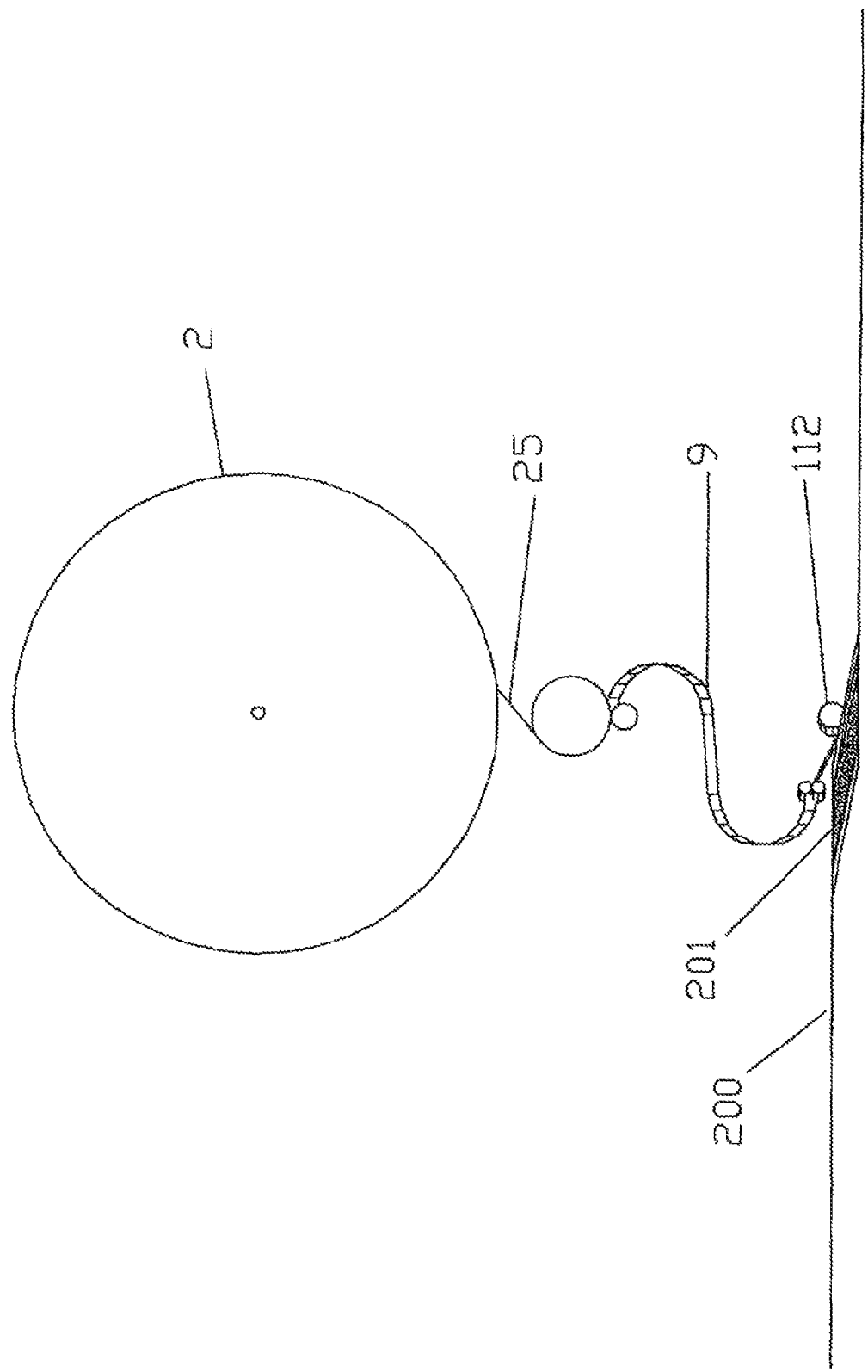

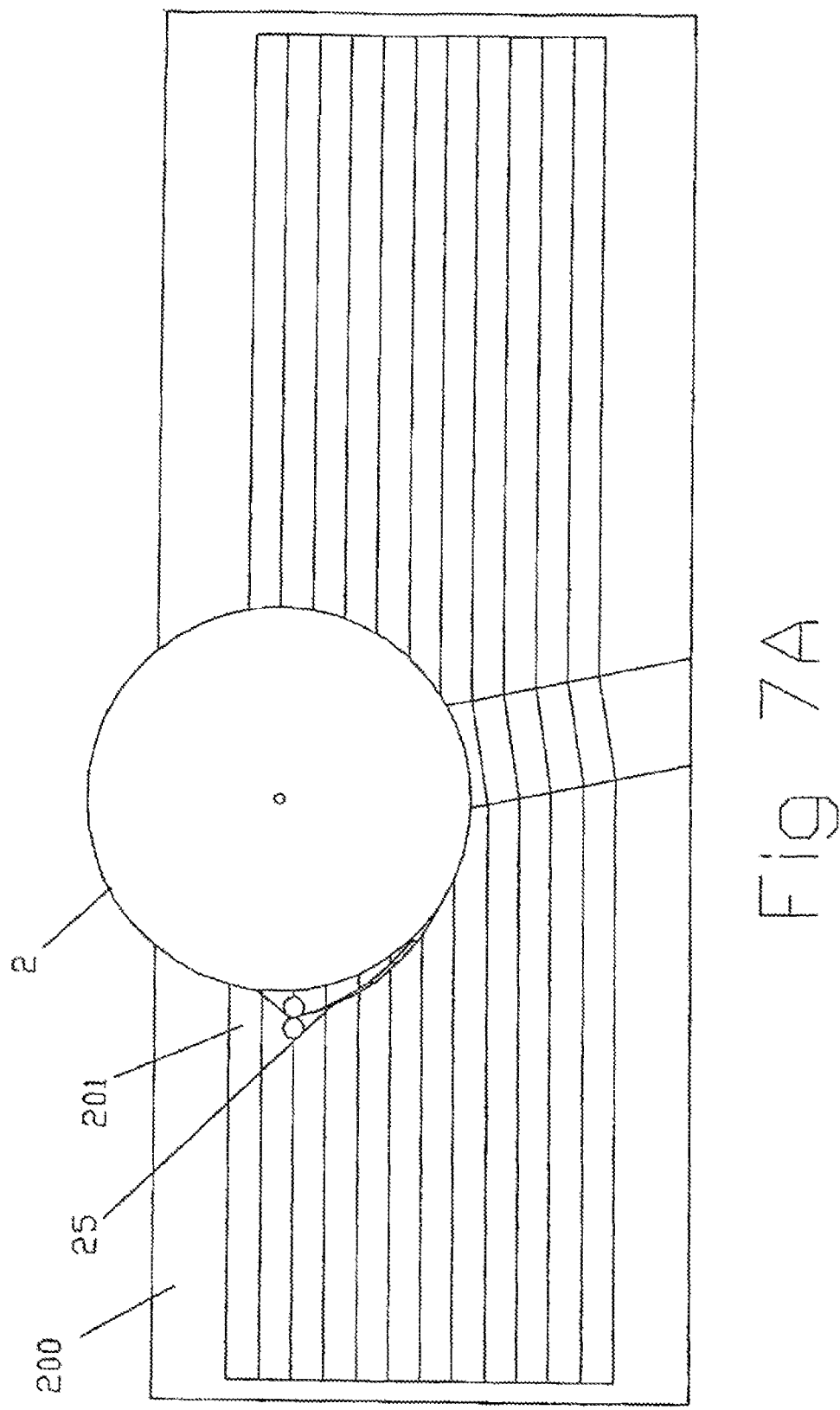

TAPE LAYING APPARATUS AND METHOD

This present application is a Continuation-In-Part of U.S. application Ser. No. 11/570,516, which was filed on Oct. 14, 2008. U.S. application Ser. No. 11/570,516 relies for priority on International Patent Application No. PCT/IB2005/004184, filed on Jun. 10, 2005 and on U.S. Provisional Patent Application Ser. No. 60/581,948, filed on Jun. 22, 2004. The contents of all three patent applications are incorporated herein by reference. It is noted that U.S. patent application Ser. No. 11/570,516 will issue as U.S. Pat. No. 7,836,931 on Nov. 23, 2010.

FIELD OF THE INVENTION

This application relates generally to machines that utilize a tape head to lay down composite strips on a surface and, more specifically, to machines that utilize a single tape head or multiple tape heads simultaneously to lay fiber tape onto a contoured surface or mandrel.

BACKGROUND OF THE INVENTION

Because of the nature of a tape, especially a stiff fiber tape, existing tape heads maintain a tape trajectory from the tape supply reel to the point of application onto a tool that does not allow the tape to move significantly out of a single plane. Existing tape head designs are comprised of (1) a tape supply reel; (2) a tape driving and cutting device; (3) a compaction roller or shoe that impresses the tape on to the surface of the part in process; and (4) a tape backer take-up reel. In these prior implementations, these four items are mounted to a common rigid structure such that their relative positions are fixed.

A number of designs have provided limited independent freedom of motion of the compaction roller with respect to the other three elements described above. Some of the prior art designs have passive compliance built into the compaction roller or to the compaction roller rotational shaft support, while others have a controlled position displacement by means of a motor or linear actuator. The designs with compliance of the compaction roller provide this feature to allow tension control across the tape width and allow limited steering of the tape or to impart a correcting force to keep the tape tracking down the centerline of the compaction roller.

One example provides for a tape head where the compaction roller can articulate about an axis normal to the compaction roller tangent surface at the intended work surface contact point. This example also provides for an accumulation of fiber tape such that the compaction roller can perform rapid motions to accommodate surface normal vector changes without having to respond with the entire tape head structure immediately. However, the compaction roller work surface contact point is fixed in the plane of the supply reel so that lateral displacements of compaction roller require the entire structure to be displaced. Further, the necessary apparatus and control system requires numerous controls and actuators. The tape accumulation mechanism induces sharp bends in the tape and given the large dimensions of the entire assembly would not be advantageous for a multiple tape head system where close location of adjacent tape heads may be necessary.

During tape lay-down a tape head assembly is steered and oriented to keep the compaction roller's axis normal to the direction of travel and, normal to the work surface as the compaction roller lays tape along the tape center line. These motions require the entire mass and the entire volume of this structure to be accelerated, moved and decelerated imposing large demands for motor power and volume clearance around the tape head structure. The inertia is both translational and rotational for the tape head mass plus the rotational inertia of the supply reel. The supporting structure must also be larger and more massive to accurately place the tape head relative to the tool or mandrel surface. The fact that the tape reel must be moved generally with the compaction roller limits the size of this reel and accordingly the amount of tape that can be laid down on a part between tape re-loads.

Another example discloses a method to lay down fiber tape that utilizes multiple tape heads each laying down a single fiber tape in coordination with the other tape heads and a rotating mandrel tool to fabricate a single large fuselage section. This multiple head fiber tape machine provides for a considerable reduction in the time required to fabricate a large fuselage section. However, since it utilizes a prior art tape head design, the size of the fiber tape supply reel and its replenishment must be offset by the demands for space, as each tape head must be articulated during the lay-up process and be accessible for replenishment. The result is a very large heavy support structure required to maintain the tight positional tolerances between heads and limited tape head packing density during operation, limiting the number of heads that can be engaged in the lay-up process simultaneously.

A still further example exhibits a method and apparatus to provide a tape head that does not have to be rotated at the termination of each tape pass. This is accomplished by having two or more tape reels where, in one example, the two reels are at opposite sides of the compaction roller. While eliminating the need to perform the large rotations between the termination of one pass and the start of another, this design increases the overall weight and space required and the rotational moment of inertia. A support structure and motion control means would have to be larger and more powerful to accommodate this type of design.

DEFINITIONS

Composite tape lay down heads are utilized to fabricate structural components that are comprised of multiple plies or lamina of unidirectional fiber tapes either pre-impregnated with an adhesive resin or infused with an adhesive resin after lay-up assembly. The fabrication is carried out by adding successive strips of fiber tape onto a rigid contoured support mold structure or contoured mandrel known as the tool which usually defines one surface of the finished part. Normally strips of composite tape are laid down side-by-side until the surface of the part is fully covered. One layer of generally parallel tape is known as a lamina. Successive lamina are laid down each on top of the preceding lamina, usually at a different angle of orientation to adjacent lamina. The surface upon which a tape is being applied is known as the work surface. The finished part which is comprised of many lamina is known as a laminate.

When the lay-up procedure is completed, the finished part, while still on the tool, is normally placed in a pressure and temperature controlled chamber known as an autoclave to aid in the consolidation of the part and cure the resin adhesive.

Each strip of fiber tape can be applied to the tool surface along any direction. However, the path that the tape is to follow must not cause kinking or buckling of the tape. This constraint is known as natural path and this type of path on a contoured surface will have continuous zero geodesic curvature.

In a number of applications such as parts of the aerodynamic surfaces as used on aerospace vehicles, some of the lamina cover only a portion of the part surface and these are usually associated with thicker sections of the laminate known as doublers where load concentrations are expected to be higher. One or a number of tape heads are manipulated relative to the surface of the tool by automatic machinery or a gantry system. The relative motion between the tape head and the tool may include the motion of the tool, such as in the case of a rotating mandrel with a contoured surface. In the specific case of a resin impregnated fiber tape, a wax paper tape known as a backer is usually releasably adhered to one side of the tape. The backer function is to prevent the tape from adhering to itself while in roll form. This backer is relatively easy to peel away from the fiber tape as the backer is not utilized in the part but is discarded.

It is important to distinguish between the type of tape head addressed by the present invention from other methods of laying down composite materials such a fiber placement, yarn placement and filament winding. A fiber, a yarn or a filament are in general geometrically one dimensional and can follow a straight line trajectory or a series of straight line trajectories along their paths from their supply source to the point of application, making turns if need be by means of pulleys or smooth rigid curved guides.

A tape as manipulated in the present invention is a flat two dimensional ribbon with intrinsic geometric constraints. For example a flat tape does not allow twisting along a straight trajectory without inducing significant shear in the tape causing for example a striated fibrous tape to splay, split apart or buckle. In general the vectors normal to the tape surface at any two points along the tape's length must be in the same plane unless the tape's path includes an untensioned space curve such that the zero Gaussian curvature of the tape be preserved.

SUMMARY OF THE INVENTION

The present invention solves the above problems by mechanically separating a prior art tape head into two independent parts. Each part may be articulated independently, or one with respect to the other. The tape from a supply reel passes through the space between the two independent structures, taking a path that substantially maintains the zero Gaussian curvature of the tape, and allows smooth but substantially out of plane bending on the tape.

Unidirectional carbon fiber tapes are extremely stiff along their length, but are in general somewhat fragile due to the their filament and uncured adhesive composition. Filament metrics must be respected as the tape may splay or split if even small amounts of shear or bending are imparted along the tape trajectory. If the Gaussian curvature of the tape is maintained near to zero then the tape will not be subjected to detrimental shear forces. Further, if the bending that the tape is subjected to is moderate, then the tape and backer will retain their fiber and bond integrity. These tape path limitations may easily be met if the tape is allowed to travel in a substantially or partially unrestrained curved path between the supply reel and the compaction roller.

A substantially or partially unrestrained curved path may take the form of a C-shaped half circle, an S-shaped path, or may take the form of part of a helix. In all forms the tape's Gaussian curvature remains substantially close to zero. This curved path can be referred as a compliance loop.

A motorized feed roller located on a supply reel frame pulls tape from the supply reel and pushes the tape into the compliance loop. Another motorized feed roller located on the compaction roller structure pulls tape from the compliance loop. These two motors must manage the amount of tape in the loop, and do so by combining feedback from velocity and position sensors measuring the amount of tape passing through each end of the loop, and by sensing the loop depth by means of contact or non-contact sensors such as ultrasonic or optical distance measuring sensors. This type of tape path curve has been used for many years by motion picture cameras and projectors and is normally referred to as film loop or storage loop. The film loop provides for a small amount of un-tensioned film between the supply reel and the frame exposure mechanism on the camera. A similar loop is also maintained between the frame exposure mechanism and the film take-up reel. The frame exposure mechanism requires very high accelerations and frequent starts and stops while both the supply and take-up reels are in smooth continuous motion.

The present invention takes an important step further by providing for relative translational and rotational displacements to occur as the tape moves through the compliance loop from the supply reel to the compaction roller. In general the present assembly provides for a significant decrease in the mass of the parts of the tape head that must make numerous position and track adjustments along a single tape course. It now becomes clear that maneuvering the compaction roller is much less demanding of the volume of space required as compared to the prior art. Further, the motion control system driving the compaction roller, comprised of motors, transmissions and amplifiers, can now be substantially reduced in size and cost.

Another advantage of the present assembly is that it allows a very large tape supply reel to be used since the supply reel may be remote (for instance at least about 10 to 100 times the width of the tape) and does not need to have its axis aligned with the compaction roller. In a multi-head system, the present invention allows for mounting a number of supply reel structures on a common frame, this frame can move relative to the work surface. Each supply reel structure is provided with only a steering rotation of the supply reel axis with respect to the common frame. Each supply reel would also have an associated compaction roller structure that could make translational and rotational orientation movements relative to the common frame.

The present invention provides for the compaction roller to perform the following motions independently of the supply reel:

Advance and retreat along the tape path sufficiently to allow tape cutting while the supply reel remains in translational motion relative to the tool surface;

Roll about the tape centerline sufficiently to maintain the tool surface normal;

Pitch about the compaction roller contact point with the work surface, where the pitch axis of rotation would be parallel to the compaction roller shaft axis, to maintain the compaction roller structure normal to the work surface;

Shift laterally and vertically so that the compaction roller can maintain tape centerline and maintain natural path constraints as required while traveling over varying surface features on the tool; and Shift laterally to allow the tape head access to a reasonable candidate tape centerline that may not be directly below the tape carriage centerline.

All of these motions are on the order of two or three times the width of the tape and, for the motion normal to the tool or work surface, displacements of up to four or five times the width of the tape are practical.

Other aspects of the invention will become apparent to those skilled in the art after appreciating the details presented below.

BRIEF DESCRIPTION OF THE DRAWING(S)

The present invention is described in connection with the drawing appended hereto, in which:

FIGS. 5A and 5B are top elevation and perspective views respectively of a supply rail structure and compaction roller structure of six tape heads mounted on six locations on a single carriage simultaneously addressing six separate tape courses on a work surface.

FIGS. 6A, 6B and 6C are top elevation, perspective and side views respectively of a supply reel structure and compaction roller structure illustrating a single tape with an S-shaped tape path addressing a laterally displaced tape course.

FIGS. 7A and 7B are to plan and side elevation respectively of a supply reel structure and compaction roller structure on a single tape head with a helical-shaped tape path addressing a laterally displaced tape course.

DETAILED DESCRIPTION OF EMBODIMENT(S) OF THE INVENTION

In one example, an automatic tape head assembly for a multiple axis tape laying machine for depositing tape in courses upon a work surface comprises a tape supply reel and a tape compaction roller. The tape compaction roller comprises a tape feed puller and a tape cutter. The tape supply reel and tape compaction roller are independently movable relative to the work surface and with respect to each other. The tape fed from the supply reel to the compaction roller and a tape travel path there between is maintained at substantially zero Gaussian curvature. The tape travel path between the supply reel and the compaction roller may be greater than a straight line between the supply reel and compaction roller. The tape head assembly may further comprise a backer reel rotatable around a third axis and a backer travel path between the compaction roller and the backer reel. The backer travel path may be greater than a straight line between the compaction roller and the backer reel. The movement of the supply reel and compaction roller is accomplished by independent positioning motors, and the positioning motors may be controlled by a common controller. The supply reel may unwind tape and feed it to the compaction roller in a continuous motion. The length of the tape travel path may vary during operation of the tape laying machine. The tape travel path may have a generally C-shaped curve, a generally S-shaped curve, or a generally helical-shaped curve.

The following example shown in the attached drawings is merely one alternative of the present invention. Of course those of skill in the art may take the teachings herein and develop further and additional variations based on the teachings herein.

Figure 1:
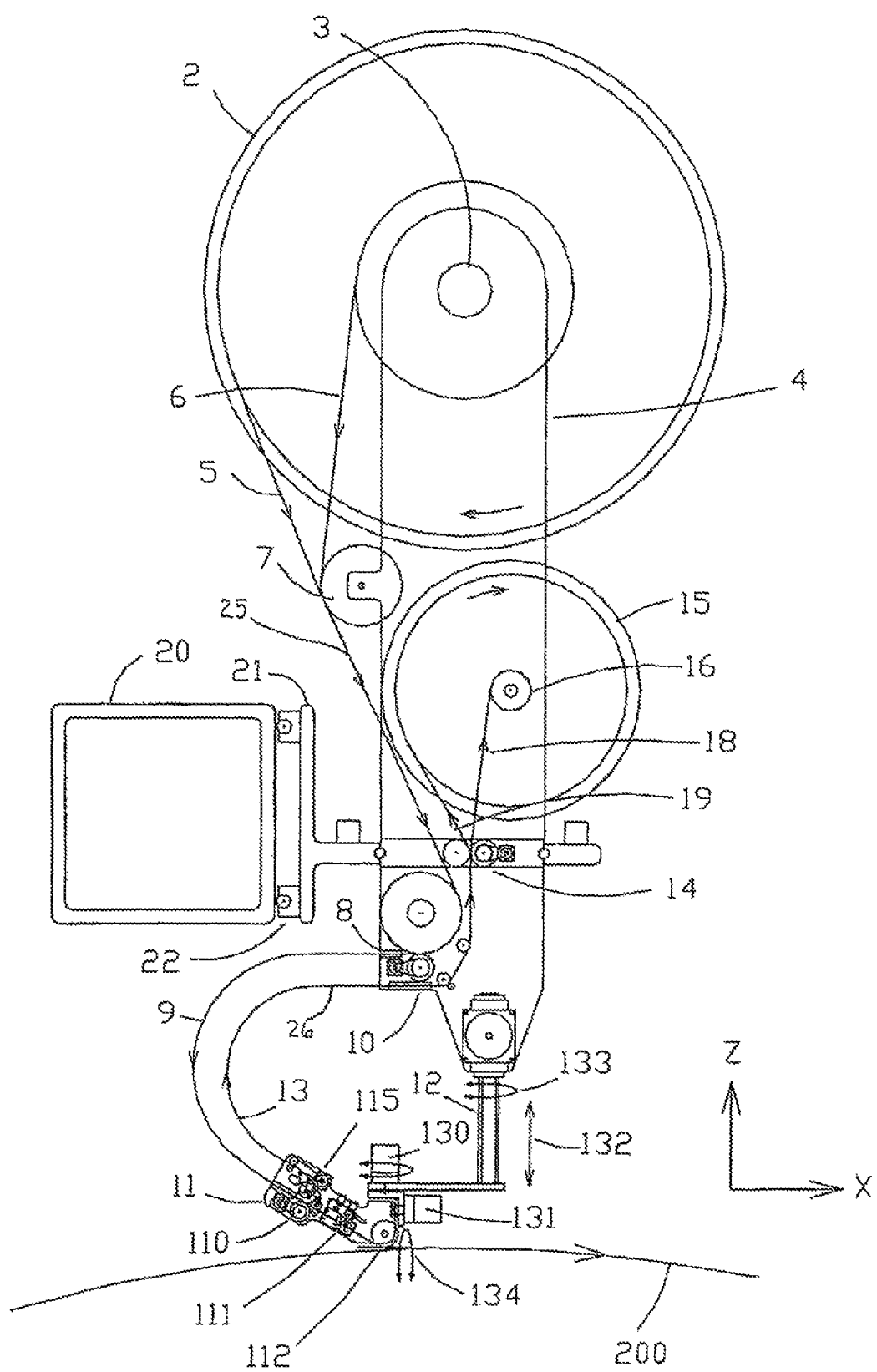
FIG. 1 is a side elevation schematic view of a tape head assembly in accordance with the present invention.
Figure 2:
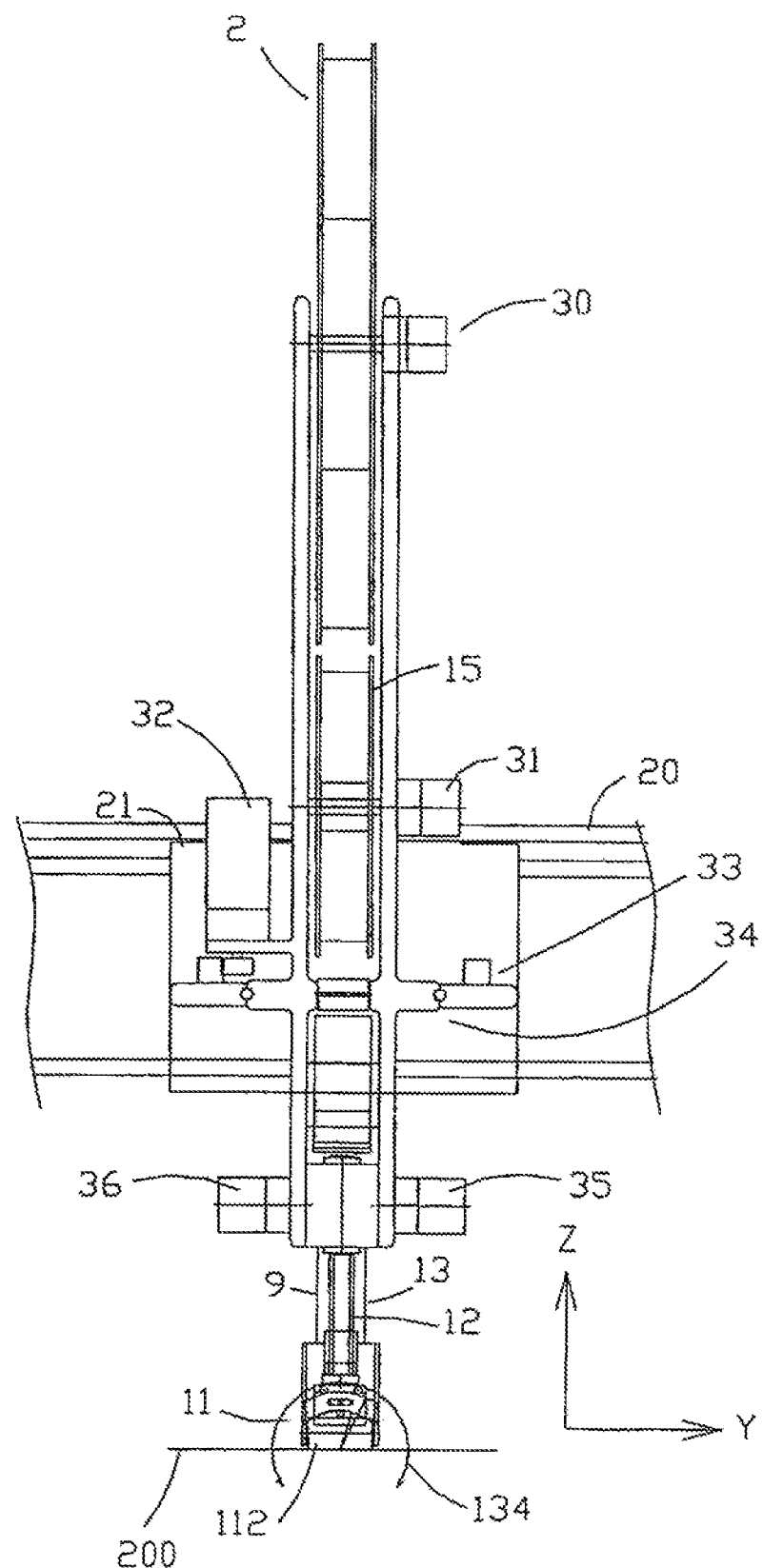
FIG. 2 is a front elevation schematic view of the tape head assembly shown in FIG. 1.

Referring to FIG. 1 and FIG. 2, an example of an automated tape head assembly is shown. A tape supply reel 2, rotates on shaft 3, that is supported by the supply reel structure 4, pays out tape 25 (shown when reel is full 5 and shown when reel is almost depleted 6), is guided over a roller 7, and descends to the motorized tape supply feed assembly 8. The feed assembly 8 pushes the tape 25 into the compliance loop 9.

The tape travel path between the feed assembly 8 (a portion of the supply reel structure) and the feed assembly 110 (a portion of the compaction roller structure) is shown as compliance loop 9. As shown, the tape travel path (compliance loop 9) has a C-shaped curve. The tape travel path defines a substantially or partially unrestrained curve that enables a substantially zero Gaussian curvature of the tape. A tape travel path, in order to be substantially or partially unrestrained, must be greater than the distance defined by a straight line between a supply reel and a compaction roller. A tape travel path may also be S-shaped or define a generally helical-shaped curve.

Referring again to FIGS. 1 and 2, the tape 25 enters the compaction roller structure 11 and is guided into a motorized feed assembly 110 where the backer tape 26 is removed and pushed into its unique compliance loop 13 by an associated motorized feed assembly 115. The fiber tape 25, now separated from the backer tape 26 is pushed forward by the pinch feed assembly 110, through the flying shear cutter assembly 111 and under the compaction roller 112 where it is pressed adherently onto the work surface. The actual roller 112 can alternatively be a shoe or a presser shoe or foot. These alternative constructions are included herein with respect to the term compaction roller.

The backer tape 26 passes through guides 10 to motorized puller assembly 14 and then wound onto a motorized take-up reel 15 rotating on a shaft 16. Paths 18 and 19 show the backer tape's path as it is wound onto the take-up reel at the start 18 and finish 19 of winding.

The entire assembly is mounted on a single carriage 21 that can be moved by servo motor control (not shown) along linear bearings 22 fixed to a support beam 20. The supply reel structure 2 is mounted on the carriage 21 by means of a rotary bearing 34 whose rotation is positioned by a servo motor 32 and associated pinion and ring gear 33. The compaction roller structure 11 is moved relative to the supply reel structure 4 by four servo motors—35, 36, 130 and 131.

The compaction roller structure 11 is positioned relative to the supply reel structure 4 by the coordinated motion of the following four motors and associated mechanical drive components: servo motor 35 is able to translate the compaction roller structure support 12 parallel to the Z axis 132, servo motor 36 is able to rotate the compaction roller structure support 12 about an axis indicated by 133, servo motor 36 is able to rotate the compaction roller structure 11 about another axis indicated by 130 and servo motor 131 is able to rotate the compaction roller structure 11 about the axis indicated by 134. Lastly the tool surface 200 is able to translate along one axis controlled by a servo motor (not shown). The coordinated motion of all of these motors are able to position the compaction roller structure 11 relative to the supply reel structure 4 and relative to the work surface 200 in all degrees of freedom except pitch. The pitch rotation axis is defined as the vector normal to both the tape course centerline and to the work surface at any point along the tape centerline. Because of the moderate surface contours of the tool experienced in this particular embodiment and to simplify the presentation, the pitch axis was not deemed necessary. And further, the axis required to translate the compaction roller structure in the direction along the tape path at the point of compaction roller contact with the work surface, is not required in this embodiment to simplify the presentation and because the compaction roller structure contains a flying shear so that the tape head can cut while in motion relative to the work surface.

Suitable inverse kinematics calculations, well known in the art, that utilize the desired tape course centerline, work surface normal vector and the kinematics relationships of the all of the axis explained above are required to provide the command signals for each of the associated motors. The relative position of the compaction roller structure 11 with respect to the supply reel structure 4 is further governed by the tape and backer compliance loops 9 and 13 respectively.

A C-shaped compliance loop 9 (as shown) will require that there be a small but significant steering angle offset between the plane normal to the shaft of the supply reel and the plane of the normal to the shaft of the compaction roller when the compaction roller structure has to be either positioned laterally (133 rotated) or rolled at an angle (134 rotated) to the supply reel structure.

An S-shaped compliance loop does not require the small but significant angle as detailed above, but does impose a tighter bending radius on the tape. The compliance loops 9 and 13 for the tape 25 and the backer 26 respectively are managed by their respective motorized feed assemblies 110 and 14.

The supply reel 2 is managed by a servo motor 30 operating in torque mode so that it can rotate the reel to assist in its startup and apply a resisting torque to manage the tension on the tape and decelerate the reel. The backer reel 15 is managed in a similar manner as the supply reel. However, the backer servo motor 31 is usually applying torque to wind the tape.

Figure 3A:
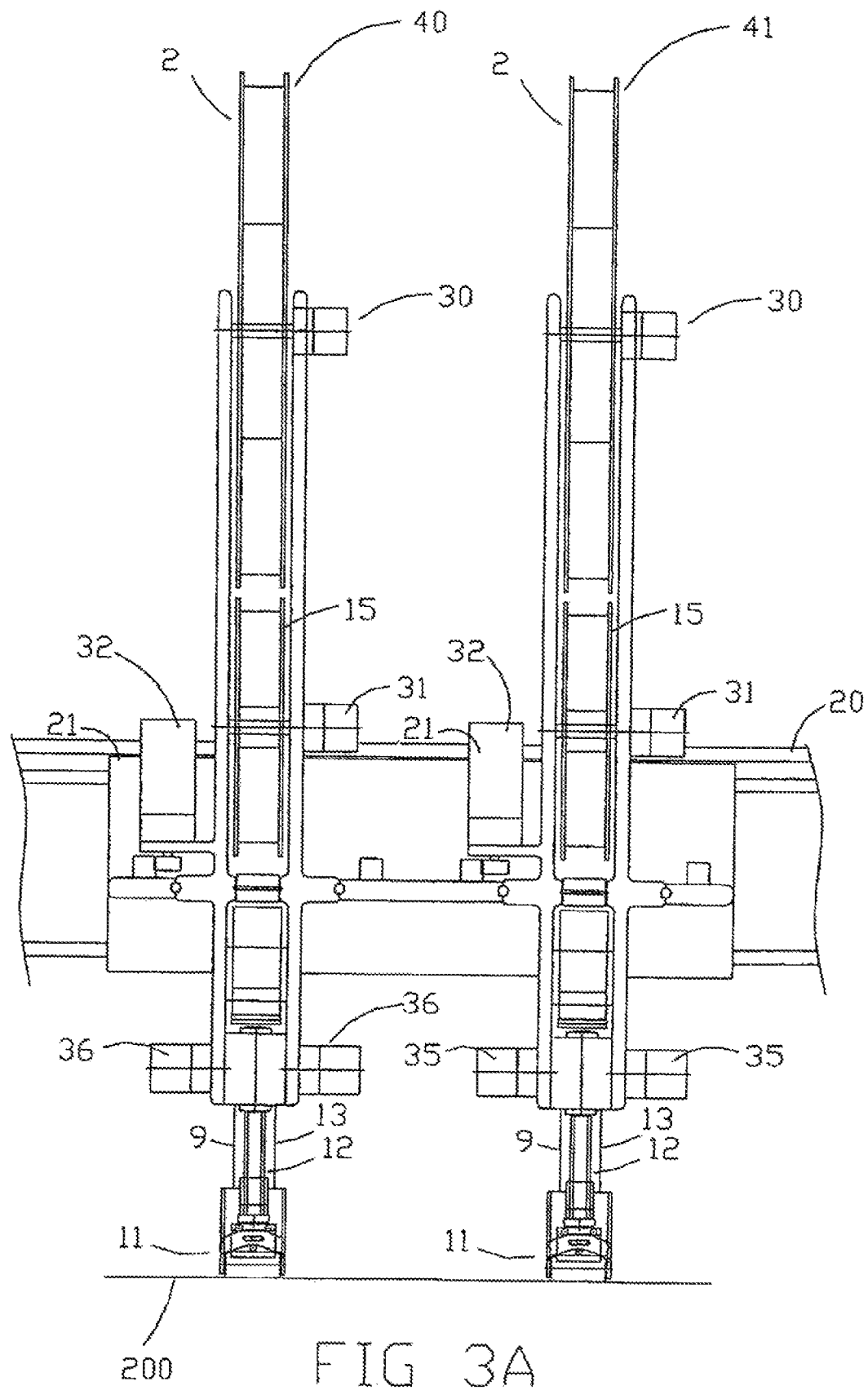
FIG. 3A is a front elevation view of a pair of tape head assemblies identical to the one shown in FIGS. 1 and 2.
Figure 3B:
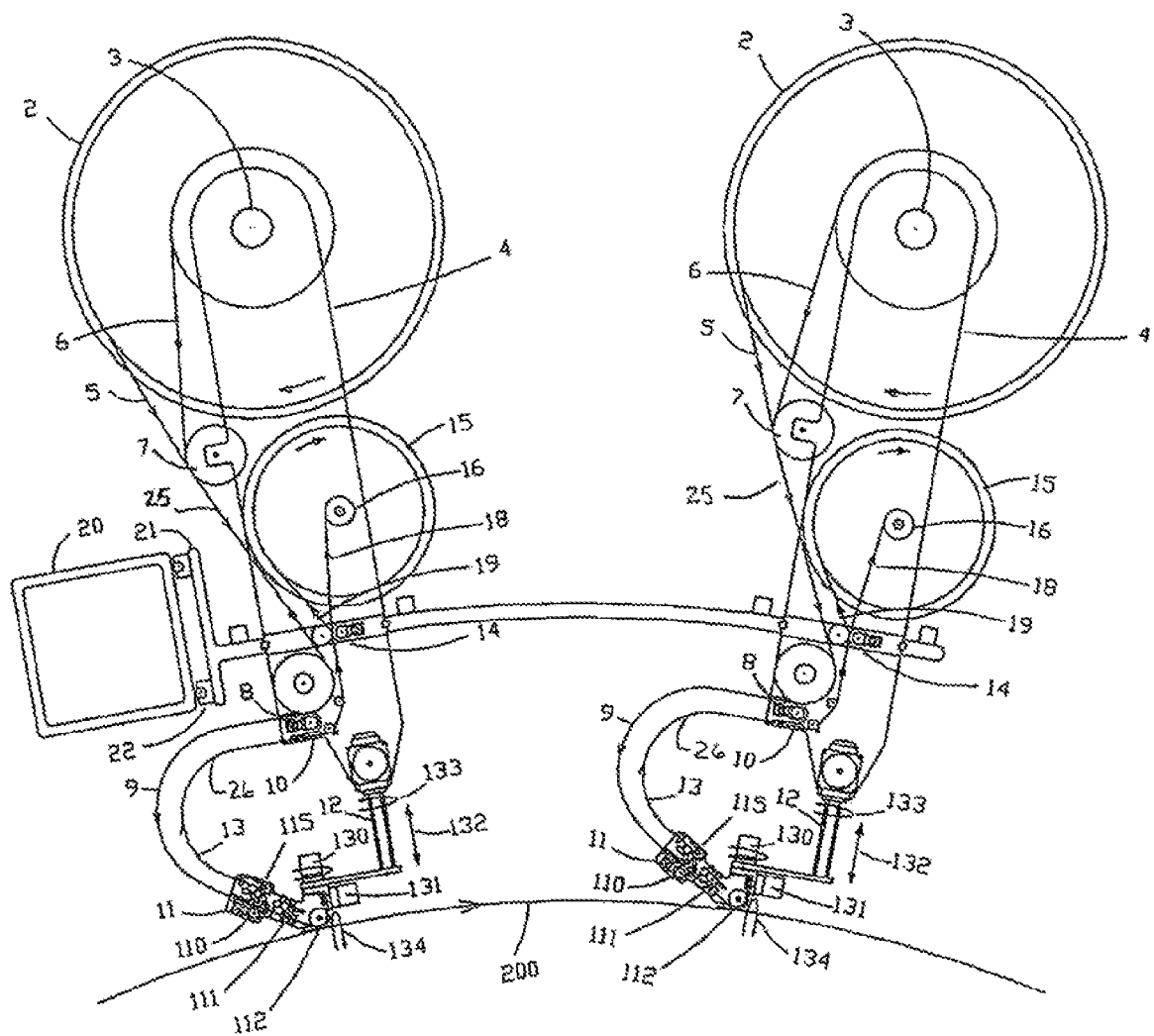
FIG. 3B is a side elevation view a pair of tape head assemblies each identical to the one shown in FIGS. 1 and 2 in an alternative configuration to that shown in FIG. 3A.

FIGS. 3A and 3B show two different arrangements where two tape heads are mounted on to the same carriage 21, said carriage being able to move along the Y axis beam, translating both tape head supply reel structures 2 in fixed relation to one another along the Y axis. Each supply reel structure may rotate independently relative to the carriage 21 about an axis generally normal to the work surface that each head is to address.

When the beam is able to be controllably moved relative to the work surface in the X direction, both of the tape heads are able to apply tape simultaneously due to the fact that the compaction roller assembly of each tape head can be positioned relative to its associated supply reel structure. Each tape head is able to follow generally parallel, but significantly varying courses that, in this embodiment, are on the order of two or three times the width of the tape.

Tape head proximity for fixedly mounting the heads to a common carriage is governed by avoidance of collisions between each of the tape heads or any appendage thereof during expected simultaneous movements.

Figure 4A:
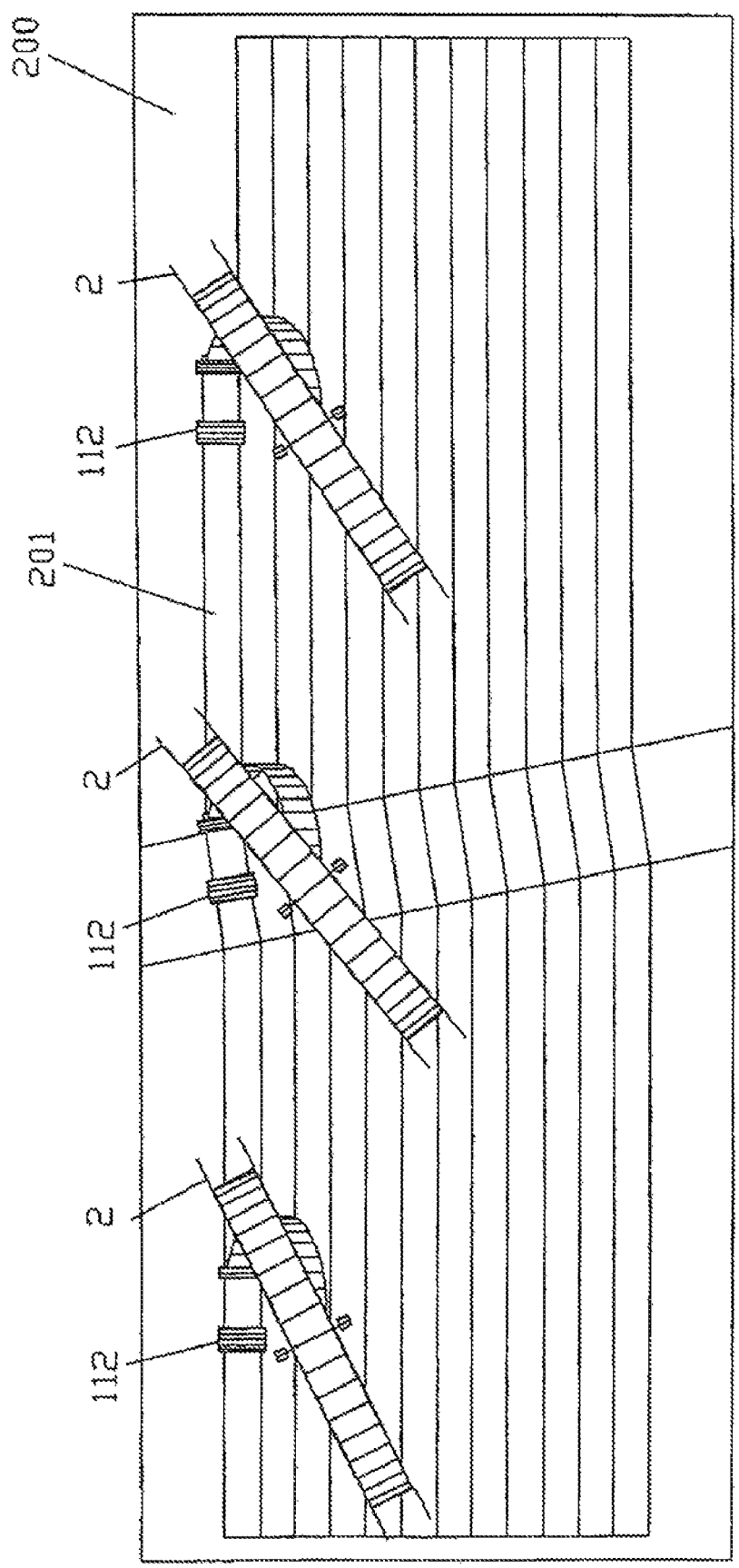
FIGS. 4A and 4B are top elevation and perspective views respectively of a single supply wheel structure and compaction roll structure shown at three successive locations as a tape head passes over a ramp on a work surface.
Figure 4B:
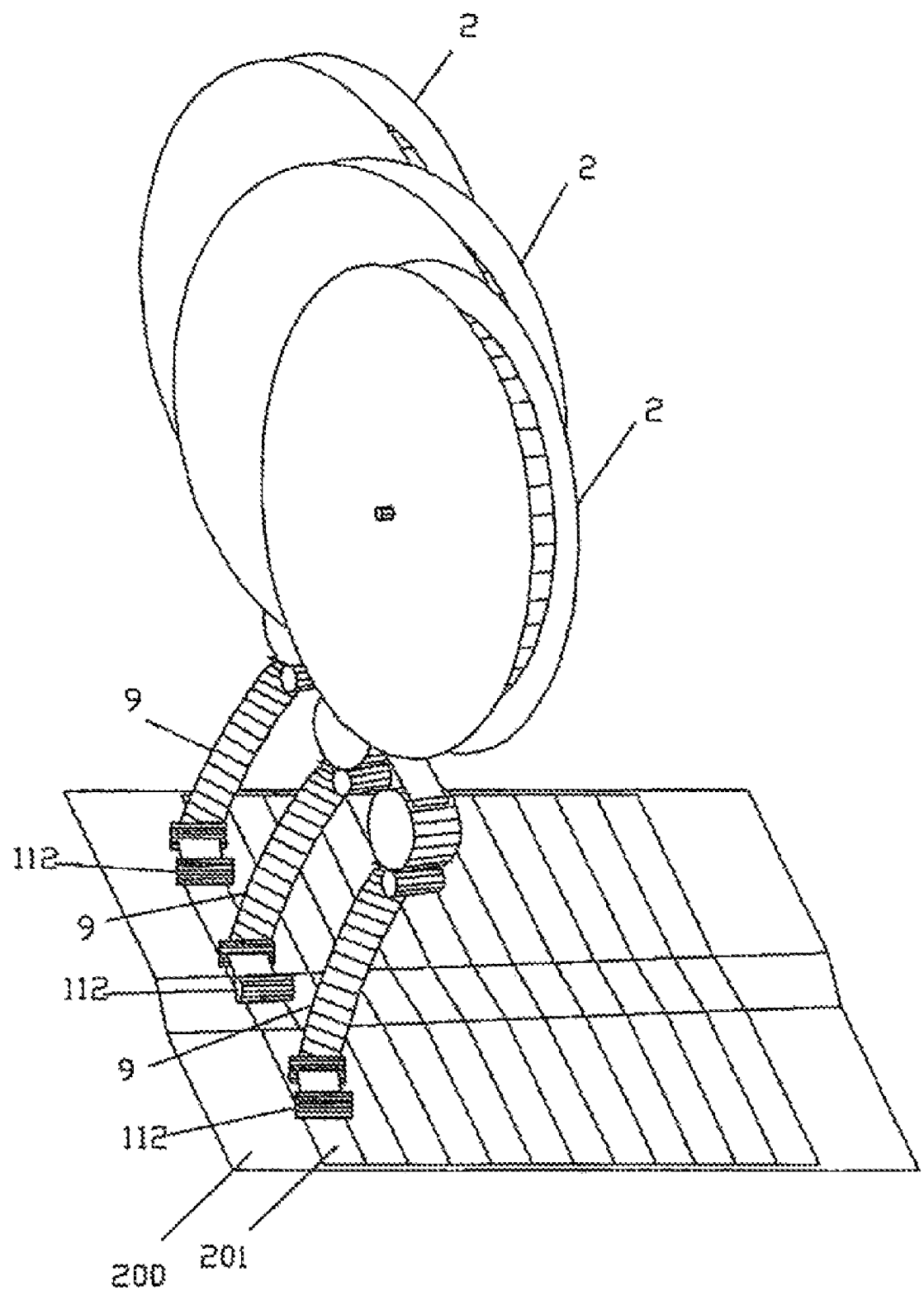

Turning now to FIGS. 4A and 4B, there is shown a supply reel 2 and compaction roller 112 as discussed in more detail earlier herein. The additional tape head structure has been removed for the sake of demonstrating the positional relationship between the supply reel 2 and the compaction roller 112. In FIGS. 4A and 4B, the applied tape 201 has been pressed onto the work surface 200. Three successive locations of the supply reel 2 versus the compaction roller 112 are shown as the tape head passes over a ramp on the work surface 200. The supply reel 2 moves relative to the work surface 200 at a fixed height along a straight line, while the compaction roller 112 structure makes path changes in the transverse, roll and elevation directions. The tape travel path or compliance loop 9 between the supply reel 2 and compaction roller 112 shows a C-shape. The compliance loop 9 and the relative orientation of the supply reel 2 with the compaction roller 112 allow the compaction roller to enjoy substantial independent movement in relation to the supply reel.

Figure 5B:
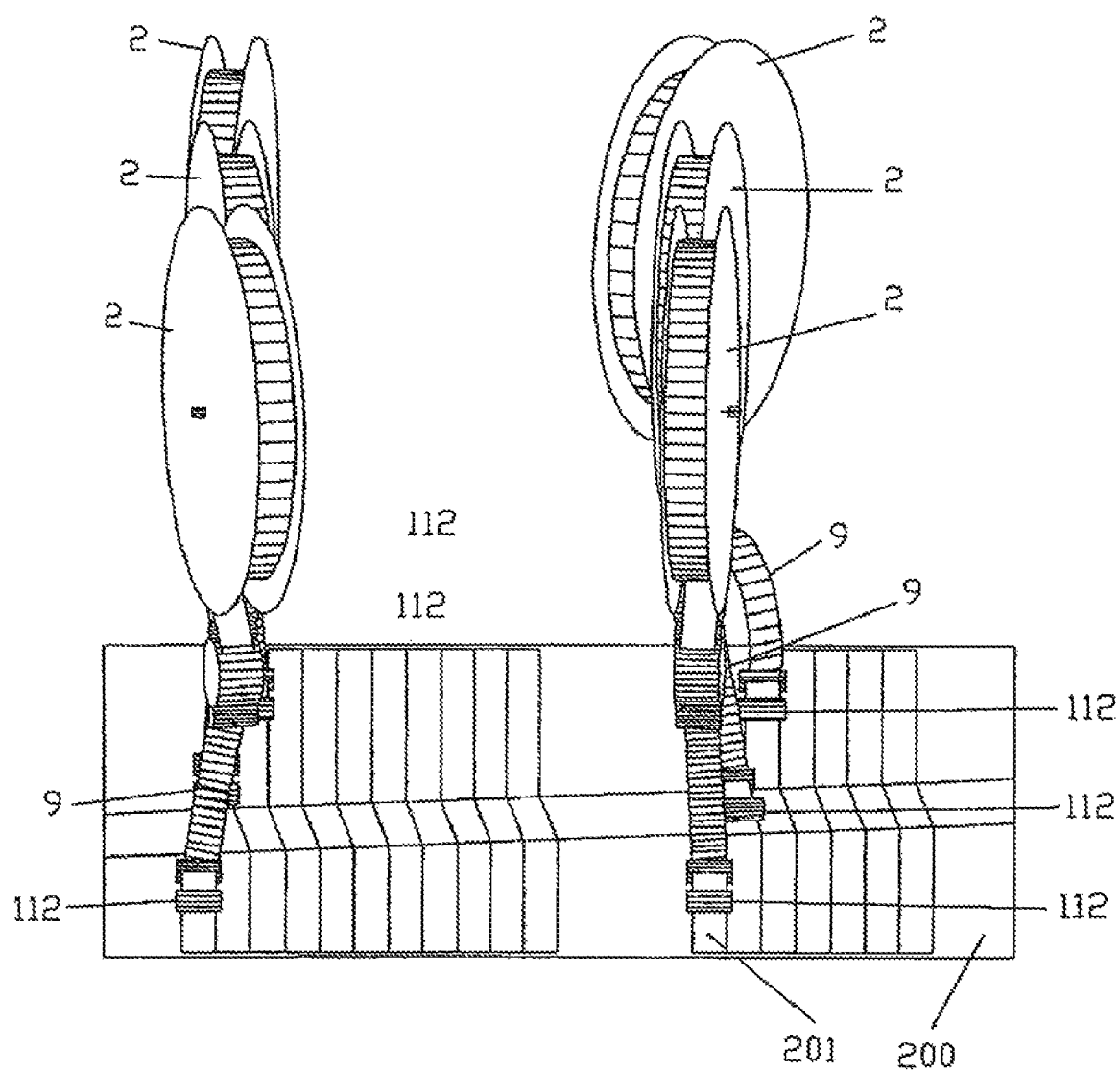

FIGS. 5A and 5B illustrate how an alternative tape head construction could operate. In these figures, the supply reel 2 are all fixed to a single carriage (not shown) to allow the tape head to address six separate strips of applied tape 201 on the work surface 200. FIGS. 5A and 5B demonstrate how this single tape head construction would conceptually operate in an efficient manner. The compliance loops 9 facilitate the independent movement of the compaction rollers 112 with respect to the respective supply reels 2.

Figure 6B:
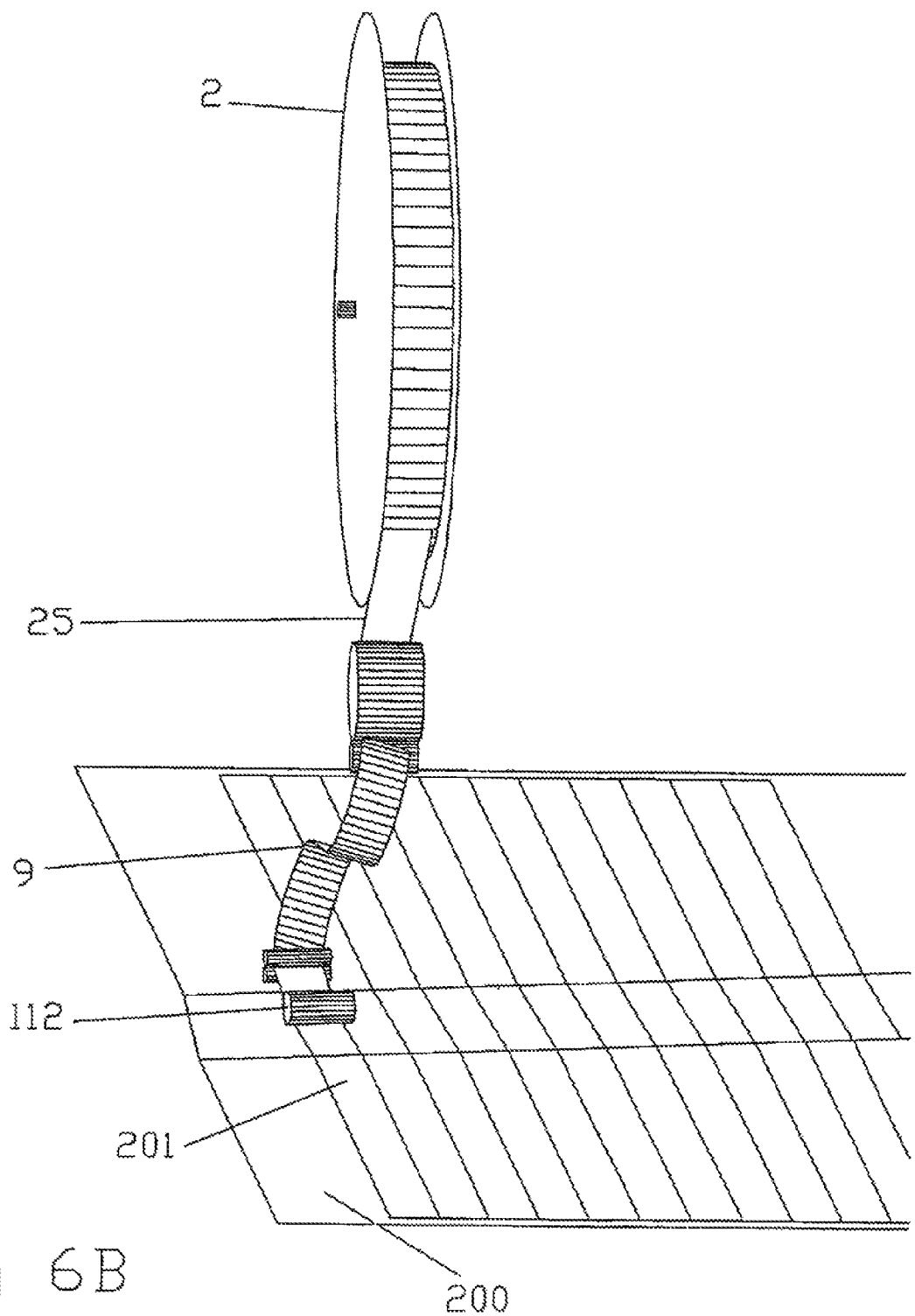

FIGS. 6A, 6B and 6C demonstrate various views of a supply reel 2 and compaction roller 112, and importantly, an S-shaped compliance loop 9. These figures illustrate how the applied tape 201 is adhered to the work surface 200 by a compaction roller assembly as described. This alternative demonstrates the S-shaped compliance loop between the tape supply 2 and the compaction roller 112. Of course, as with all of the tape travel path or compliance loop 9 illustrated herein, the size of the compliance loop may vary during operation or by design as a result of the physical characteristics of the tape 25 that is being laid down.

Figure 7B:
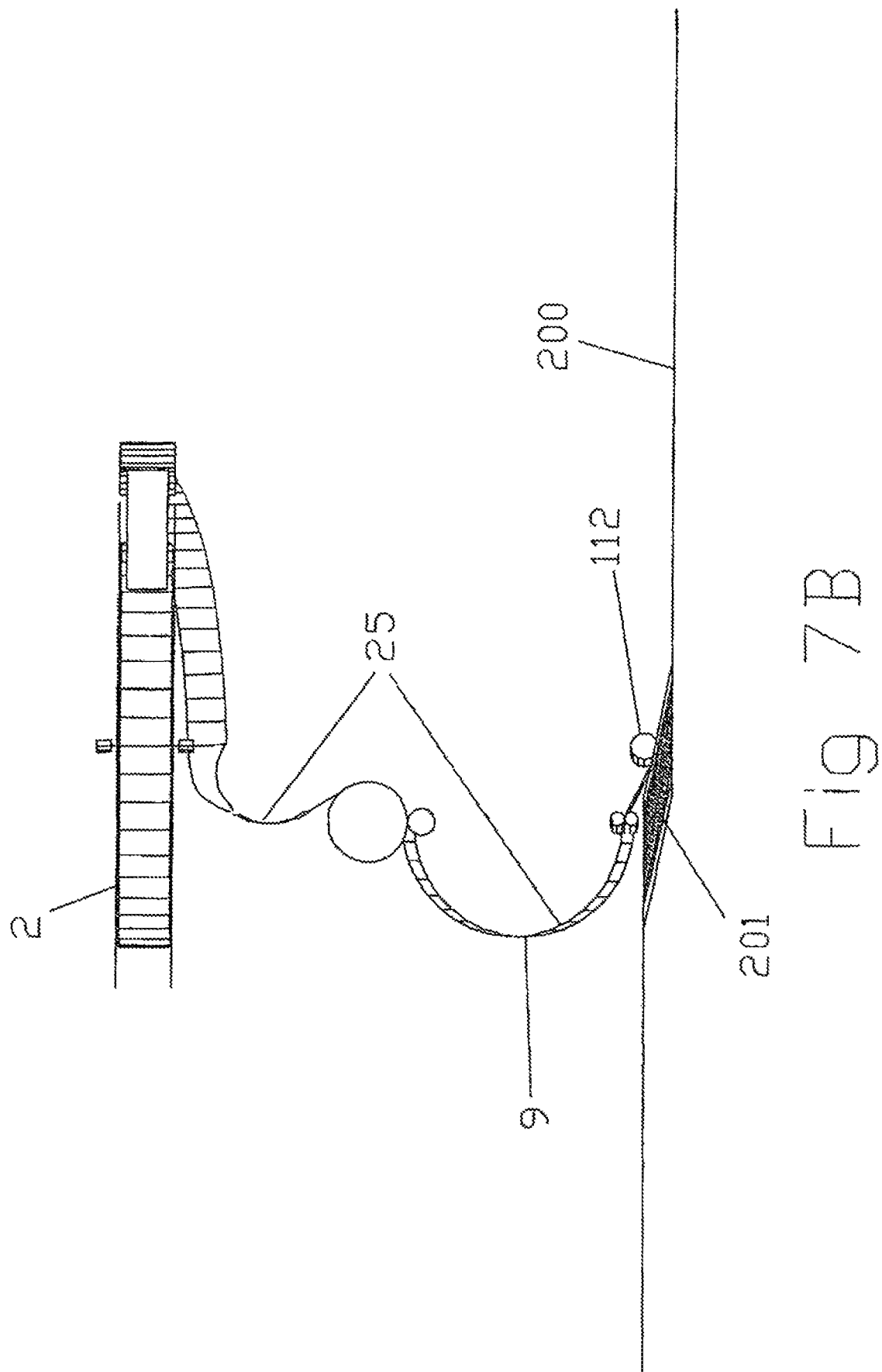

FIGS. 7A and 7B illustrate a supply reel 2 and compaction roller 112 and a helical-shaped compliance loop 9 there between. In these figures, the supply reel 2 is oriented such that the tape 25 will form a helical curve as it feeds from the reel 2 to the compaction roller 112. The size, curvature, and number of curves of the helical curve that may be formed will vary depending on the operation of the tape head assembly and the type of tape that is being laid down.

Generally, with reference to all of FIGS. 4-7, the reference coordinate frame shows X, Y, Z as the right hand orthoganal axis, about which U, V, W are the rotational axis, also right hand oriented. The motion of the supply reel 2 relative to the work surface 200 is in the positive X direction. Otherwise, the supply reel 2 maintains a fixed Y and Z position where it is only allowed to rotate about the Z axis. On the other hand, the compaction roller 112 is allowed to articulate in at least four degrees of freedom relative to its associated supply reel 2. The reel support structure has one degree of freedom—it is able to rotate about the Z axis. The reel support structure can be fixed to a frame that either 1) is able to translate in the X-Y plan relative to the work surface, 2) is able to translate in only the X or Y axis will the work surface is able to translate along the other of the two axes (X or Y), or 3) is stationary, where the work surface is able to translate in the X and Y directions.

Figure 8:
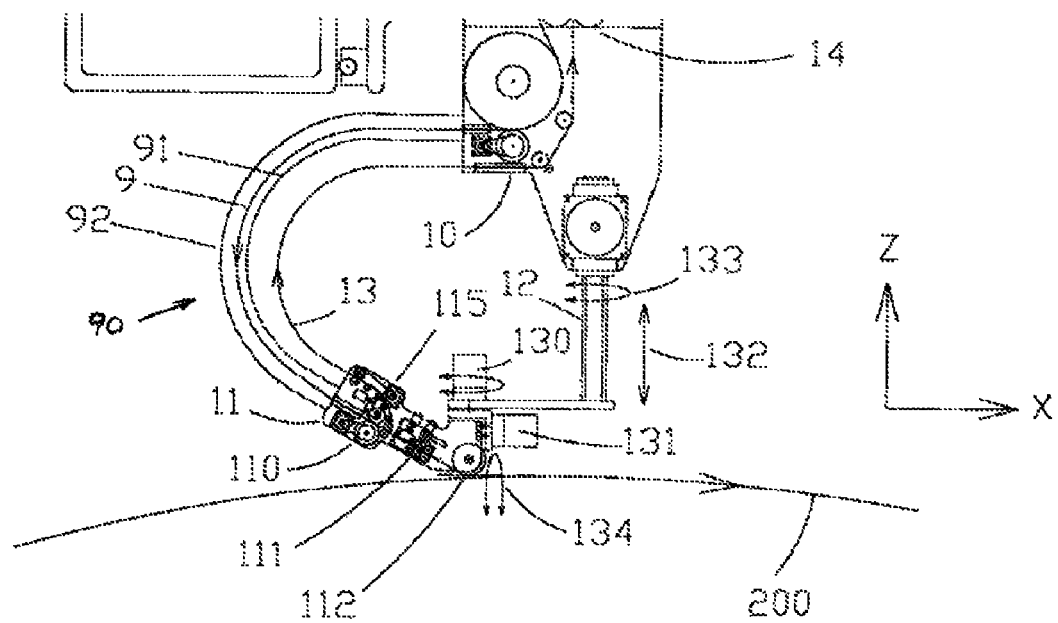
FIG. 8 is a partial, side elevation schematic view of a tape head assembly in accordance with the present invention, illustrating an additional embodiment contemplated by the present invention.

FIG. 8 illustrates the relevant portion of another embodiment contemplated for the present invention. In this illustration, the tape dispenser includes many of the same features and elements as the tape dispenser illustrated in FIG. 1. Accordingly, the same reference numbers are used. In addition, the discussion of the tape dispenser is largely the same as discussed above and, therefore, is not repeated here.

In the embodiment illustrated in FIG. 8, a guide chute 90 has been added around the tape 25 in the compliance loop 9. The guide chute 90 includes an inner chute portion 91 and an outer chute portion 92, which are positioned on either side of the compliance loop 9 in a spaced-apart relationship thereto. The chute 90 is provided to guide the position of the tape 25 to ensure that the tape 25 remains in the appropriate disposition as it travels to the motorized feed assembly 110 from the motorized tape supply feed assembly 8. It also protects the tape 25 as it travels within the compliance loop 9.

In this embodiment, the tape 25 in the compliance loop 9 retains its C-shape and, thereby, maintains a travel path that defines a substantially or partially unrestrained curve that enables a substantially zero Gaussian curvature. As noted, the chute 90 assists with maintaining the shape of the tape in the compliance loop 9. It also assists to discourage breakage of the tape 25, which may occur as a result of external forces applied to the segment of the tape 25 in the compliance loop 9.

The chute 90 may be made from two separate sheets of material that are positioned on either side of the compliance loop 9, as illustrated. The chute may be opened at the sides, meaning that it is possible to view the travel path of the tape 25 in the compliance loop 9 through the sides of the chute 90. Alternatively, the chute 90 may be entirely closed at its sides. In still one further contemplated embodiment, the outer chute portion 92 may be eliminated in whole or in part, creating a U-shaped channel around the tape 25.

It is contemplated that the chute 90 will be made from a flexible material so that the chute 90 moves together with the motorized feed assembly 110 as the tape 25 is laid upon the tool surface 200. Materials that may comprise the chute 90 include, but are not limited to, steel, iron, iron-based alloys, aluminum, aluminum-based alloys, copper, copper-based alloys, plastics, rubbers, elastomeric materials, composite materials, combinations of these substances, and the like.

It is contemplated that the chute 90 also may be made from a number of segments that are articulated with respect to one another. An example includes, but is not limited to, a bike chain that includes multiple segments that are articulated with respect to one another. With such a construction, the chute 90 offers considerable strength and rigidity, but also a considerable amount of flexibility.

Figure 9:
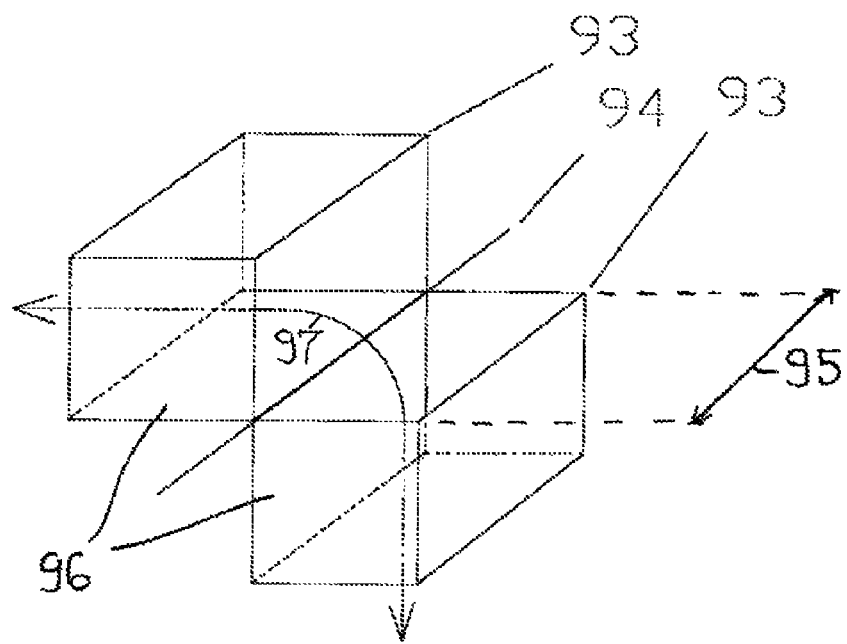
FIG. 9 is a graphic representation of the construction of a chute contemplated in connection with the embodiment illustrated in FIG. 8.

FIG. 9 provides a graphic illustration of still one further contemplated embodiment of the present invention. Here, it is contemplated that the chute 90 is made from a number of articulated sections 93 that are connected, in an articulated manner, to one another.

In FIG. 9, two such articulated sections 93 are connected to one another via a hinge 94. The hinge 94 permits the articulated sections 93 to move with respect to one another, thereby providing a chute 90 with an adjustable geometry. As should be apparent, for the chute 90 to encompass the tape 25 along the entirety of the compliance loop 9, a plurality of articulated sections 93 are expected to be connected to one another via a plurality of hinges 94.

In the embodiment illustrated in FIG. 9, it is contemplated that the hinges 94 will permit adjacent ones of the articulated sections 93 to move with respect to one another. It is also contemplated, however, that the articulated sections 93 will be prevented from any other type of movement due to their construction. In other words, while the articulated sections 93 may flex along the line 97, their motion would be prohibited at the point where adjacent articulated sections 93 form a straight line (i.e., are aligned next to one another without any angular displacement).

With respect to the composition of the individual articulated sections 93, any suitable material may be employed without departing from the scope of the present invention. As noted above, the materials may include, but are not limited to, steel, iron, iron-based alloys, aluminum, aluminum-based alloys, copper, copper-based alloys, plastics, rubbers, elastomeric materials, composite materials, combinations of these substances, and the like.

It is contemplated that the hinges 94 will extend from one lateral edge of each articulated section 93 to the other. However, this is not required to practice the present invention. The hinges 94 may be segmented across the lateral width 95 of the articulated sections 93, without departing from the scope of the present invention.

In connection with the articulated sections 93, a rectangular shape is illustrated. The rectangular shape is merely illustrative of one embodiment contemplated for the present invention. As should be apparent, any suitable shape may be employed without departing from the scope of the present invention. In addition, the articulated sections 93 may be U-shaped members that are connected to one another, leaving a portion of the tape exposed. In connection with this embodiment, it is contemplated that the sides of the U-shaped portions may be slit in several locations, hereby permitting the bottom surfaces 96 to flex more freely.

With respect to the embodiment illustrated in FIG. 9, the bottom surfaces 96 of the articulated sections 93 are connected to one another via the hinge 94. The bottom surfaces 96 are understood to establish and maintain the travel path that defines the substantially or partially unrestrained curve that enables a substantially zero Gaussian curvature of the tape 25. In other words, the bottom surfaces 96 (i.e., the portion of the articulated sections 93 that comprise the chute 90) are responsible, in this embodiment, for maintaining the tape 25 in the appropriate compliance curve 9 for purposes of the present invention.

As should also be apparent, while the chute 90 is discussed in connection with the C-shaped travel path of the tape 25, the chute also may be employed where the tape 25 travels through an S-shaped curve or a helical curve, among others.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. An automated tape head assembly for a multiple axis tape laying machine for depositing tape in courses upon a work surface, the tape head assembly comprising:
    a tape supply reel and a tape compaction roller;
    the tape compaction roller comprising a tape feed puller and a tape cutter;
    the tape supply reel and tape compaction roller being independently moveable relative to the work surface and with respect to each other; and
    a chute encompassing the tape in a tape travel path from the tape supply reel to the tape compaction roller;
    wherein the tape travel path is maintained unrestrained at substantially zero Gaussian curvature.

2. An automated tape head assembly as described in claim 1, wherein the tape travel path between the supply reel and the compaction roller is greater than a straight line between the supply reel and compaction roller.

3. An automated tape head assembly as described in claim 1, further comprising a backer reel and a backer travel path between the compaction roller and the backer reel, wherein the backer travel path is greater than a straight line between the compaction roller and the backer reel.

4. An automated tape head assembly as described in claim 1, wherein the movement of the supply reel and compaction roller is accomplished by independent positioning motors.

5. An automated tape head assembly as described in claim 4, wherein the positioning motors are controlled by a common controller.

6. An automated tape head assembly as described in claim 1, wherein the supply reel unwinds tape and feeds it to the compaction roller in a continuous motion.

7. An automated tape head assembly as described in claim 2, wherein the length of the tape travel path varies during operation of the tape laying machine.

8. An automated tape head assembly as described in claim 1, wherein the tape travel path between the supply reel and the compaction roller has a generally C-shaped curve.

9. An automated tape head assembly as described in claim 1, wherein the tape travel path between the supply reel and the compaction roller has a generally S-shaped curve.

10. An automated tape head assembly as described in claim 1, wherein the tape travel path between the supply reel and the compaction roller has a generally helical-shaped curve.

11. An automated tape head assembly as described in claim 1, wherein the chute comprises:
　at least two articulated sections; and
　a hinge connecting the at least two articulated sections to one another.

12. An automated tape head assembly as described in claim 11, wherein:
　the articulated sections define bottom surfaces,
　at least the bottom surfaces of the articulated sections are connected to one another via the hinge, and
　the bottom surfaces are maintained at substantially zero Gaussian curvature.

13. An automated tape head assembly as described in claim 11, wherein the articulated sections comprise at least one material selected from a group comprising steel, iron, iron-based alloys, aluminum, aluminum-based alloys, copper, copper-based alloys, plastics, rubbers, elastomeric materials, composite materials, and combinations thereof.

14. An automated tape head assembly as described in claim 1, wherein the chute comprises a flexible tube that surrounds the tape travel path.

* * * * *